Nov. 18, 1958   R. J. B. BEISTLE ET AL   2,861,248
SIGNAL DELAY MEANS

Filed Aug. 22, 1956   2 Sheets-Sheet 1

INVENTORS
ROY J. B. BEISTLE
JOHN A. KRISTY
BY *Isidore Match*
ATTORNEY

United States Patent Office 2,861,248
Patented Nov. 18, 1958

2,861,248

SIGNAL DELAY MEANS

Roy J. B. Beistle, Cannondale, and John A. Kristy, Bridgeport, Conn., assignors to Sperry Rand Corporation, New York, N. Y., a corporation of Delaware Application August 22, 1956, Serial No. 605,585

20 Claims. (Cl. 333—30)

This invention relates to signal delay means and, more particularly, relates to mechanical signal delay lines such as those comprising a magnetostrictive material.

The termination of mechanical delay lines to prevent the occurrence of troublesome echo signals has generally presented difficulties. One difficulty is the fact that in magnetostrictive delay lines, for example, signals generated by a transmitter coil and applied as an input to such lines will be reflected at both ends thereof so that a receiver coil spaced from the transmitter coil will pick up two different signals due to a single input signal. Another difficulty encountered in the use of mechanical delay lines is the tendency of the length of line to change in response to a variation in temperature and thus cause a change in the delay characteristics. This leads to a troublesome departure from the proper timing relationship of a train of signals circulating in the line. A third difficulty is the fact that the normally required quite substantial length of such lines introduces the need of cumbersome equipment for their positioning.

Accordingly, it is the primary object of the present invention to provide mechanical signal delay means wherein troublesome echo signals are substantially eliminated, wherein means are provided for automatically adjusting the length of the delay line a proper amount in response to changes in temperature, and wherein the delay line is arranged in a manner to permit the packaging thereof with a minimum of space consumption.

It is a further object to provide an efficient shielded packaging arrangement including the delay line of the preceding object in combination with associated electrical circuitry.

Generally speaking, in accordance with a preferred embodiment of the present invention, there is provided signal delay means which includes a mechanical delay line such as one comprising a magnetostrictive material. Each end of the line has a terminating element thereon which has an impedance substantially approximating the characteristic terminal impedance of the line. Transmitter means is positioned near one end of the line for applying a signal thereto and receiver means is positioned near the other end of the line for picking up a delayed signal therefrom, the distances of the transmitter and receiver means from the respective ends being so chosen that the echos of signals reflected thereat are in phase opposition whereby they substantially cancel each other. Means are provided for simultaneously moving the transmitter and receiver means equal distances to vary the length of delay line therebetween and temperature sensitive means are included to automatically compensate for changes in length of the line due to changes in temperature whereby no change occurs in the difference of the distances of the transmitter and receiver means from their respective ends of the line. Thus, no matter what the change, the echos of signals reflected from the ends are maintaind in phase opposition and the delay characteristics of the line is maintained substantially constant.

Also, in accordance with the invention, there is provided in combination with electrical circuitry, a housing for positioning the components thereof and a signal delay line associated with the circuitry. Means adapted to move slidably along the axis of the housing is provided therein for simultaneously moving the transmitter and receiver means to vary the length of delay line therebetween and to maintain them at distances having a chosen difference from their respective ends of the line. A temperature sensitive element operatively associated with the slidable means is provided within the housing to cause the latter to move in response to temperature changes thereby compensating for any change in length of delay line intermediate the transmitter and receiver means caused by such temperature changes. The housing may consist of a suitable metal and thus function as a shield.

One feature of this invention is the inclusion of terminal elements on the delay line comprising a compliant temperature inert plastic material, the terminal elements having an impedance approximating the characteristic impedance of the line so that echos of signals reflected at the ends are relatively very small.

A second feature of the invention is the positioning of a transmitter coil and a receiver coil around the line at distances having a chosen difference from the respective ends of the line so that the echos of reflected signals are in phase opposition.

A third feature of the invention is the provision of means for simultaneously moving the transmitter and receiver coils to vary the length of delay line therebetween as desired while maintaining the chosen difference in the distances from their ends of the line whereby the echos of reflected signals are maintained in phase opposition.

A fourth feature is the provision of temperature sensitive means for automatically varying the position of the transmitter and receiver coils to compensate for changes in line length due to changes in temperature.

A fifth feature of the invention is the use of a magnetostrictive delay line comprising a thin wall narrow bore flexible tubular structure as the mechanical delay line to eliminate a good portion of the hysteresis loss normally encountered in ribbonlike magnetostrictive delay lines.

A sixth feature is the arrangement of the delay line having an intermediate coiled portion to permit efficient packaging thereof.

A seventh feature is the provision of an enclosed housing for positioning the delay line and the components of an associated electrical circuit, the housing serving as a shield and containing insulating brackets having a plurality of spaced transverse grooves therein for receiving the separate loops of the intermediate coiled portion of the line, the brackets serving both as positioning structures and as low friction mounting devices to eliminate spurious reflections.

An eighth feature is the use of a unitary magnetic structure for providing a biasing magnetic field to both the transmitter and receiver coil.

For a better understanding of the present invention, together with other and further objects thereof, reference is had to the following description taken in connection with the accompanying drawings, and its scope will be pointed out in the appended claims.

Figure 1:
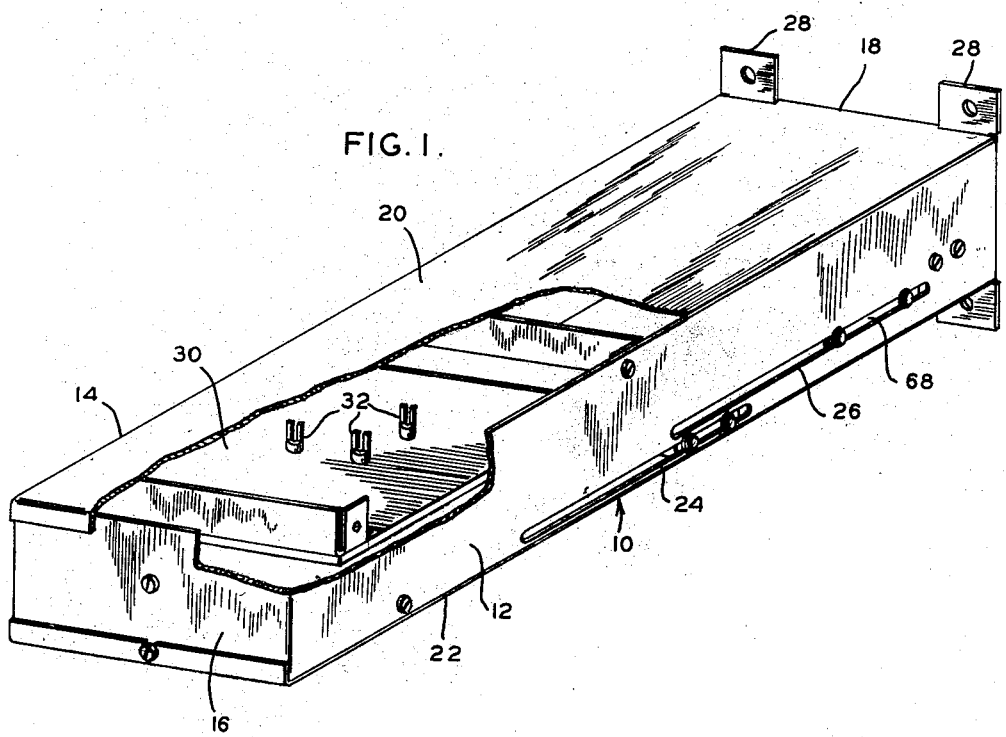
Fig. 1 is a perspective view of a housing with one wall partly cut away and shows a fixed panel disposed in one plane for mounting circuit components, the signal delay means being disposed in a different plane.

Referring now more particular to Fig. 1, there is shown a housing 10 which may preferably be of a parallelepiped configuration as shown but of course may be of any suitable geometry. Housing 10 preferably consists of a lightweight metal such as aluminum to enable its functioning as a shield in addition to that of a container. For convenience in description, housing 10 may be described as comprising sidewalls 12 and 14, end walls 16 and 18 and detachable top and bottom walls 20 and 22. Sidewalls 12 and 14 are each provided with overlapping spaced substantially parallel slots 24 and 26, the corresponding slots in each sidewall being in registration. End wall 18 is provided with extensions generally designated by numeral 28 to permit affixation of the housing to a fixed structure (not shown). Top and bottom walls 20 and 22 are provided with portions which overlap end walls 16 and 18 to enable their affixation to the end walls if it is so desired.

A panel 30 is shown upon which there are provided fixtures generally designated as 32 for mounting the circuit components of the electrical circuit with which the signal delay means is associated. Panel 30 may suitably consists of a substantially rigid material such as wood, plastic, pressed fiber or the like. As is shown, panel 30 is disposed in a plane parallel to the planes of walls 20 and 22 and is affixed to a pair of brackets which are in turn affixed to the inner surfaces of sidewalls 12 and 14.

Figure 2:
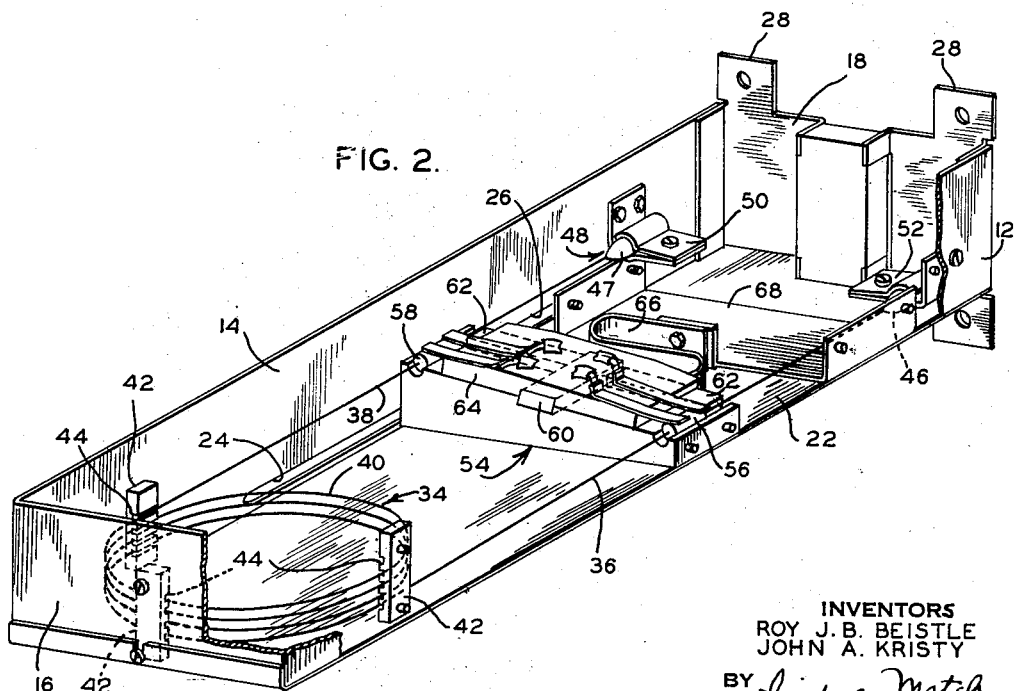
Fig. 2 is a view similar to that of Fig. 1 with both a wall and a circuit component panel removed and shows the arrangement of the signal delay means within the housing.

Referring now to Fig. 2 wherein panel 30 has been removed, there is shown the disposition of the signal delay means of this invention within housing 10 and its spatial relationship to the circuit components mounted on panel 30. The delay means includes a mechanical delay line 34 comprising end portions 36 and 38 and an intermediate helically coiled portion 40. The loops of coiled portion 40 are supported at one end of the housing by brackets generally designated by numeral 42. These brackets may consist of a suitable rigid insulating material such as Lucite. It is preferable to use four of such brackets angularly displaced 90° with respect to the circumference of each loop of coil. As is shown, a first bracket is attached to the inner surface of end wall 16, second and third brackets are attached to the inner surfaces respectively of sidewalls 12 and 14 and a fourth bracket is attached to the under surface of panel 30. The brackets are provided with spaced transverse substantially parallel disposed grooves generally designated by numeral 44, corresponding grooves receiving a portion of a loop of coiled portion 40. Effectively, brackets 42 provide a comblike structure with the portions of a loop received between the teeth thereof. With this arrangement, there exists a minimum of friction and consequent minimum attenuation of pulses in the delay line. End portions 36 and 38 are disposed in substantially parallel arrangement along the longitudinal axis of housing 10 and tangentially to the loops of coiled portion 40. One end portion such as 36 is longer than the other end portion 38, the significance of which will be explained hereinbelow. On the ends of line 34 are terminating elements 46 and 48 respectively which are cured thereon. Terminating elements 46 and 48 may comprise compliant temperature inert material which is effective in absorbing acoustic reflections and echos. Examples of such material are plastic such as polyethylene, epoxy resin and high temperature waxes which are relatively inert to temperature changes such as that manufactured by Hansell, Van Winkle & Manning Company of Matawan, New Jersey and known by the trade name "Kote-rax type K." Terminating elements 46 and 48 may suitably have a teardrop configuration as shown and preferably have an impedance in mechanical ohms quite close to the characteristic terminal impedance of line 34. The line ends 47 of elements 46 and 48 respectively are of conical configuration so that the change of impedance at the end of the line is gradual. Brackets 50 and 52 extending inwardly into housing 10 from sidewalls 12 and 14 are provided for positioning terminating elements 46 and 48, the brackets suitably comprising the same material as that comprising housing 10.

Line 34 is preferably a tube of dead soft annealed nickel, the wall of which is quite thin. For example, it has been found that a tube having an overall diameter of 0.030 inch and a 0.002 inch wall thickness is advantageous. The advantage of the tube being soft annealed is that it has a lesser attenuating effect than that experienced with hard materials and upon bending, discontinuities are not set up therein as is the case with harder materials. The advantage of using a thin walled narrow bore tube rather than a solid rod lies in the fact that substantially the bulk of hysteresis losses are overcome.

It is known that when nickel is magnetized, its dimensions are changed slightly (usually not more than 20 to 30 parts per million) and such changes are called magnetostriction. An acoustic vibration can be introduced into a long rod of nickel by pulsing a small magnetizing or transmitting coil placed around it and near one end. This sound vibration travels along the rod at a rate of 5.27 microseconds per inch of path length at an ambient temperature of 20° C. The reciprocal effect of magnetostriction occurs in the rod when it is placed in a magnetic field. This effect is the change of flux in the material when subjected to a mechanical strain and obeys the law $$e = N\frac{d\phi}{dt}$$

wherein $e$ is the voltage induced, N is the number of terms of a receiver coil and $$\frac{d\phi}{df}$$

is the change in flux with respect to time. Therefore, the sound vibration can be converted back to an electrical signal by placing a second or receiving coil around the rod and placing a biasing magnet in the vicinity of the latter coil. Now, if the received pulse is amplified, reshaped and reintroduced into the transmitting end of the line, a circulating storage system results.

At a pulse repetition rate of 200,000 pulses per second, successive waves traveling along a magnetostrictive delay line are spaced apart by approximately 0.95 inch. The time interval between these pulses in 5 microseconds. A magnetostrictive delay line for storing 40 pulses is therefore 38 inches in length. The access time of such a line is accordingly 200 microseconds. The variation in delay for a 20° C. temperature change is approximately one microsecond.

Referring again to Fig. 2, a carriage 54 consisting of a suitable material such as wood, pressed fiber, plastic etc. is transversely disposed in housing 10 between the side walls and slidable in a path parallel to the longitudinal axis of housing 10. The limits of the path of slidability are determined by the length of slot 24 through which suitable adjustable screws may be affixed to the ends of carriage 54 to permit its movement or to anchor it in one location. The bottom surface of carriage 54 is flat and adapted to rest abuttingly against the inner surface of bottom wall 22. The upper surface of carriage 54 tapers in thickness, progressively diminishing from the end against side wall 20 to the end against side wall 22. On the upper surface of carriage 54 near each end thereof are semicylindrical recesses for longitudinally disposing a transmitter coil 56 and a receiver coil 58. Transmitter coil 56 comprises the usual coilform, about 0.5 inch in length, and may be of phenolic, brass, or other suitable material and is wound with several hundred turns such as for example, 600 turns. Receiver coil 58 is similar in material to and dimensions to that of transmitter coil and also has a requisite number of turns there-around such as about 100. An example of the wire winding is that known under the trade name #40 A. W. G. formex wire. As is shown, transmitter coil 56 is disposed about end portion 36 of delay line 32 and receiver coil 58 is disposed around end portion 38 of delay line 34.

Longitudinally disposed in a recess on the upper surface of carriage 54 and substantially equispaced from and parallel with coils 56 and 58 is a permanent bar magnet 60 such as that known under the trade name "Alnico V" permanent magnet. A pole piece 62 consisting of a suitable magnetic material is transversely disposed on carriage 54 between one end of magnet 60 and transmitter coil 56 and a similar pole piece 62 is disposed on carriage 54 intermediate the same end of magnet 60 and receiver coil 58. Pole pieces 62 and magnet 60 are maintained in fixed position relationship by covering piece 64 which is suitably affixed to carriage 54 by screws or like devices. If desired, coils 56 and 58 may be provided with suitable magnetic shields. It is seen that by loosening the screws passing trough slot 24 into the ends of carriage 54, the carriage is free to move along a path determined by the length of this slot. As a consequence of such movement, coils 56 and 58 which are positioned around the respective end portions of line 34 are also caused to move simultaneously equal distances in registration with each other and magnet 60. Thus, the distance of delay line 34 between the coils may be shortened or lengthened as desired to provide a given time delay. Once the required length is determined, carriage 54 may be fixed in one position by tightening the end screws through slot 24. It is seen that the wedge configuration of carriage 54 is necessary since end portion 36 emerges from helical coiled portion 40 at a different plane than end portion 38.

Attached to the face of carriage 54 opposing end wall 16 is one end of a temperature sensitive element 66, the other end of element 66 being affixed to a crosspiece 68 in housing 10 which is slidable in a path determined by the length of slot 26. Since slot 26 is substantially coextensive in length with slot 24, crosspiece 68 can move in a path which is coextensive with the path in which carriage 54 can move. Similar to carriage 54, crosspiece 68 can be rigidly affixed in one location by screws or other suitable means extending through slots 26 and into the crosspiece. Element 66 may suitably consist of a bellows or temperature responsive bimetal such as the conventional temperature sensitive bimetal and well known in the art. Element 66 is preferably utilized in a staggered S shape configuration to impart springlike characteristics thereto.

It is to be noted that if crosspiece 68 is firmly affixed in one location by means of the end screws, a change in temperature and consequent change in length of element 66 will cause motion only in carriage 54. It is further to be noted that since carriage 54 carries both coils, the change in length of line 34 between the coils will be twice the change in length of element 66. Now, if the change in ambient temperature causes a change in the length of line 34, a change will also be caused in the length of element 66. Since crosspiece 68 is fixed, the change in length of element 66 will be completely applied to carriage 54 causing movement thereof to adjust the length of line 34 between transmitter coil 56 and receiver coil 58. A suitable characteristic for element 66 in relation to the magnetostrictive nickel tube as specified above is one which causes a delay change 0.1 microsecond per 5° F. per 200 microsecond delay. Another way to express this is a delay change of 0.00263 microsecond per 5° F. per inch. Since temperature sensitive bimetallic elements to fit any required specification are well known in the art, no further description of element 66 is deemed necessary.

Figure 3:
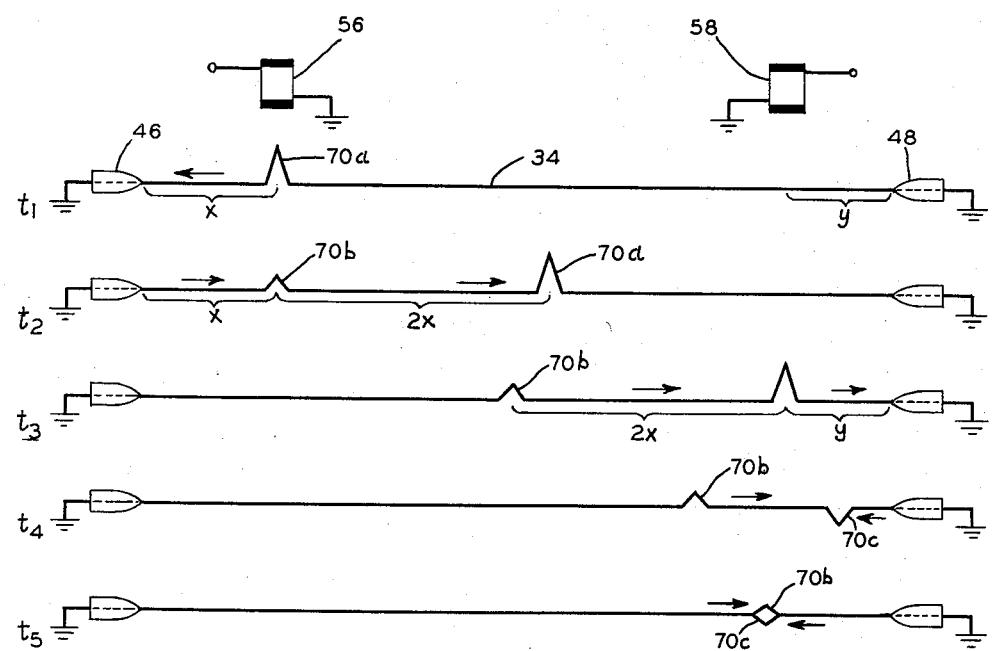
Fig. 3 schematically illustrates the mode of operation of a preferred embodiment of the invention.

The operation of the signal delay means of the present invention may best be illustrated in conjunction with Fig. 3. In this figure it is seen that transmitter coil 56 is a greater distance from its end of the line than receiver coil 58 is from its end of the line.

When a signal passes through the winding on coil 56, a signal 70a will appear in line 34 which will propagate itself in both directions along line 34 at a speed determined by the transmitting characteristics of line 34.

At a time $t_2$, signal 70a will have traveled to the right along line 34 a distance of 2X. It will have also traveled to the left and an echo signal 70b will have been produced which will have traveled to the original position of signal 70a. Because terminating element 46 approximates the characteristic impedance of line 34, signal 70b will be of much lesser amplitude than signal 70a.

At a time $t_3$, signal 70a will have traveled a sufficient distance to pass below receiver coil 58 causing a voltage to be induced in the winding of the latter and 70b will still be a distance of 2X behind 70a traveling to the right on line 34.

At a time $t_4$, signal 70a will have proceeded to the right end of line 34 and an echo pulse 70c will have been reflected therefrom. The magnitude of pulse 70c like that of 70b will be much less than that of pulse 70a because terminal element 48 similar to element 46 has an impedance approximating the characteristic terminal impedance of line 34. Signal 70c will also be opposite in phase to that of 70b since the distances $x$ and $y$ are so chosen as to have a difference in length which will cause such phase opposition in pulses reflected at opposite ends of line 34. Thus at time $t_5$, where signals 70b and 70c are simultaneously at the same position on line 34, they will cancel each other. It is thus to be seen that the asymmetric position of the coils in relation to the respective end of the line effectively removes any echo pulses therein.

When the distance between the coils is changed by design to vary the length of line therebetween or automatically by element 66 in response to temperature changes, this asymmetric relationship is maintained due to the symmetrical disposition of the coils 56 and 58 on carriage 54 so that the pulses reflected from each end of the line simultaneously reach the same point on the line in phase opposition to cancel each other.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Signal delay means including a line comprising a magnetostrictive material and having input and output ends, a terminating element at each of said ends, each of said elements having an impedance approximately equal to the characteristic terminal impedance of said line, first means for applying a signal as an input to said line, second means for picking up a delayed signal from said line, said first and second means being positioned with respect to said input and output ends respectively such that the echos of signals reflected at said ends are in phase opposition, third means for simultaneously moving said first and second means to vary the distance therebetween along said line whereby said produced echos are maintained in said phase opposition relationship and temperature sensitive means associated with said third means for varying the length of said line between said first and second means in response to temperature changes.

2. Signal delay means including a line comprising a magnetostrictive material and having input and output ends, terminating elements at each of said ends, each of said terminating elements having an impedance approximately equal to the characteristic impedance of said line, a transmitter coil associated with said line and positioned near the input end thereof for generating a signal in said line, a receiver coil associated with said line and positioned near its output end for picking up a delayed signal from said line, the distances of the transmitter coil and receiver coil from the input and output ends respectively being so chosen that the echos of signals reflected at said ends are in phase opposition, means for simultaneously moving said coils with respect to said ends to vary the length of line between the coils whereby the produced echos are maintained in said phase opposition relationship and temperature sensitive means associated with said moving means for varying the length of said line between said coils in response to temperature changes.

3. Signal delay means including a line comprising a magnetostrictive material and having input and output ends, a terminating element at each of said ends, each of said terminating elements having an impedance approximately equal to the characteristic impedance of said line, a movable transmitter coil disposed on said line and positioned near said input end for generating a signal in said line, a receiver coil disposed on said line and positioned near said output end for picking up a delayed signal from said line, the distances of the transmitter coil and receiver coil from the input and output ends respectively being so chosen that the echos of signals reflected at said ends are in phase opposition, magnetic means associated with said coils for applying a magnetic field thereto, means for simultaneously moving said coils and the associated magnetic means with respect to said ends to vary the length of said line between the coils whereby the produced echos are maintained in said phase opposition relationship, and temperature sensitive means associated with said moving means for varying the length of line between said coils in response to temperature changes.

4. Signal delay means comprising a line comprising a magnetostrictive material and having an input and an output end, said line including a coiled portion and a terminating element at each of said ends, each of said terminating elements having an impedance approximately equal to the characteristic terminal impedance of said line, a movable transmitter coil disposed on said line and positioned near said input end for generating a signal in said line, a movable receiver coil disposed on said line and positioned near said output end for picking up a delayed signal from said line, the distances of the transmitter coil and receiver coil from the input and output ends respectively being so chosen that the echos of signals reflected at said ends are in phase opposition, means associated with said coils for applying a magnetic field thereto, means for simultaneously moving said coils and the associated magnetic means with respect to said ends to vary the length of said line between the coils whereby the produced echos are maintained in said phase opposition relationship, and temperature sensitive means associated with said moving means for varying the length of line between said coils in response to temperature changes.

5. Signal delay means comprising a line comprising a magnetostrictive material and having an input and an output end, said line including an intermediate coiled portion, and a terminating element at each of said ends, each of said terminating elements having an impedance approximately equal to the characteristic terminal impedance of said line, a movable transmitter coil disposed on said line and positioned near said input end for generating a signal in said line; a movable receiver coil disposed on said line and positioned near said output end for picking up a delayed signal from said line, the distance of the transmitter coil from the input end being different from the distance of the receiver coil from the output end, said difference being so chosen that the echos of signals reflected at said ends are in phase opposition, magnetic means associated with said coils for applying a magnetic field thereto, means for simultaneously moving said coils and the associated magnetic means to vary the length of said line between said coils whereby the produced echos are maintained in said phase opposition relationship, and temperature sensitive means associated with said moving means for varying the length of line between said coils in response to temperature changes.

6. Signal delay means as defined in claim 5 wherein said terminating elements comprise a compliant non-conductive material which is substantially unaffected by temperature changes.

7. Signal delay means as defined in claim 6 wherein said material is selected from the group consisting of polyethylene, an epoxy resin and a high temperature wax.

8. Signal delay means as defined in claim 5 wherein said line comprises a nickel tube.

9. Signal delay means as defined in claim 5 wherein said temperature sensitive means is a bi-metallic element.

10. Signal delay means as defined in claim 5 wherein said magnetic means includes a unitary magnetic structure positioned intermediate said coils to provide a biasing magnetic field for each of said coils.

11. Signal delay means as defined in claim 5 wherein said line has an intermediate coiled portion and substantially parallel end portions and wherein said means for moving said coils comprises a structure for receiving said coils and for fixedly maintaining said magnetic means in association with said coils, said structure being disposed substantially transversely of said end portions and slidable therealong.

12. Signal delay means including a tube comprising a magnetostrictive material, said tube having an intermediate coiled portion and substantially parallel end portions, one of said end portions being longer than the other by a chosen quantity, a plastic element at each end of said tube, said plastic elements having an impedance substantially equal to the characteristic terminal impedance of said tube, a transmitter coil positioned around one end portion of said tube and freely slidable therealong for generating a signal in said tube, a receiver coil positioned around the other end portion of said tube and freely slidable therealong for picking up a delayed signal from said tube, a structure disposed transversely of said end portions for affixedly receiving said coils whereby movement of said structure causes simultaneous equal movement of said coils along said tube, unitary magnetic means on said structure intermediate said coils for providing a biasing magnetic field for each of said coils, a bi-metallic temperature sensitive element having one fixed end and the other end affixed to said structure whereby said structure is caused to move along both of said end portions in response to changes in temperature, said difference in the lengths of said end portions being so chosen whereby the echos of signals reflected at the respective ends of said tube are maintained in phase opposition.

13. Signal delay means comprising a housing, a line comprising a magnetostrictive material and having input and output ends, a terminating element at each of said ends having an impedance approximately equal to the characteristic terminal impedance of said line, transmitter means associated with said delay line for applying a signal as an input to said line, receiver means for picking up a delayed signal from said line, means within said housing for positioning said transmitter and receiver means given different distances from said input end and output end respectively whereby the echos of signals reflected at said ends are in phase opposition, said positioning means being adapted to simultaneously move said transmitter and receiver means equal distances to vary the length of delay line therebetween whereby said produced echos are maintained in said phase opposition relationship and temperature sensitive means associated with said movable means for varying the length of said line between said transmitter and receiver means in response to changes in temperature.

14. Signal delay means comprising a metallic housing, a line comprising a magnetostrictive material and having an output and an input end an including an intermediate coiled portion, a terminating element at each of said ends, each of said terminating elements having an impedance equal to the characteristic terminal impedance of said line, means within said housing for positioning said delay line, a transmitter coil disposed around said line near said input end and slidable therealong, a receiver coil disposed around said line near said output end and slidable therealong, magnetic means for providing a biasing magnetic field to said transmitter and receiver coils, a member within and slidable along an axis of said housing for positioning said transmitter coil, receiver coil and said magnetic means in registration whereby said registration is maintained upon movement of said member, the input and output ends of said line being disposed chosen different distances from said transmitter and receiver coil respectively whereby the echos of signals reflected at said ends are in phase opposition, and temperature sensitive means associated with said member for varying the length of line between said coils in response to changes in temperature.

15. The combination defined in claim 14 wherein said magnetic means includes a single bar magnet disposed intermediate and spaced from said coils and having its longitudinal axis substantially parallel to the longitudinal axis of said coils.

16. The combination defined in claim 14 wherein said means for positioning said line comprises insulating means affixed to an inner wall of the housing and having a plurality of spaced substantially parallel grooves for receiving the loops of said coils.

17. The combination defined in claim 14 wherein said temperature sensitive means is a bi-metallic element.

18. The combination defined in claim 17 wherein said temperature sensitive means has one end substantially firmly affixed to said housing and its other end affixed to said slidable member.

19. The combination defined in claim 14 wherein said terminating elements comprise a compliant insulating material which is relatively inert to temperature changes.

20. In combination with an electrical circuit, a metallic housing, means within said housing for physically positioning the components of said circuit, signal delay means associated with said circuit comprising a tube of magnetostrictive material having input and output ends and an intermediate coiled portion, a terminating element comprising a compliant temperature inert material on each of said ends, each of said elements having an impedance substantially equal to the characteristic terminal impedance of said tube, non-conductive means affixed to the inner wall of said housing and having a series of transverse spaced substantially parallel recesses for receiving the respective loops of said coiled portion, a transmitter coil disposed about the tube near its input end and freely movable therealong for applying a signal as an input to said tube, a receiver coil disposed about said tube near its output end and freely movable therealong for picking up a delayed signal from said tube, means slidable along the axis of said housing for positioning said coils different chosen distances from said respective ends whereby the echos of signals reflected at said ends are in phase opposition, unitary magnetic means on said slidable means intermediate said coils for providing a biasing magnetic field for each of said coils, and a temperature sensitive bi-metallic element having one substantially fixed end portion and its other end portion affixed to said slidable member whereby said slidable member is caused to move in response to temperature changes.

References Cited in the file of this patent

UNITED STATES PATENTS

| | | |
|---|---|---|
| 2,565,469 | Bradburd | Aug. 28, 1951 |
| 2,760,165 | Sullivan | Aug. 21, 1956 |

FOREIGN PATENTS

| | | |
|---|---|---|
| 714,627 | Great Britain | Sept. 1, 1954 |